United States Patent
Bando et al.

(10) Patent No.: US 8,358,865 B2
(45) Date of Patent: Jan. 22, 2013

(54) DEVICE AND METHOD FOR GRADIENT DOMAIN IMAGE DECONVOLUTION

(75) Inventors: Yosuke Bando, Fuchu (JP); Tomoyuki Nishida, Kashiwa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1406 days.

(21) Appl. No.: 12/016,333

(22) Filed: Jan. 18, 2008

(65) Prior Publication Data

US 2008/0175508 A1     Jul. 24, 2008

(30) Foreign Application Priority Data

Jan. 22, 2007    (JP) ................. 2007-011878

(51) Int. Cl.
*G06K 9/40* (2006.01)

(52) U.S. Cl. ........ 382/255; 382/254; 382/261; 382/263; 382/264; 382/279

(58) Field of Classification Search .................. 382/254, 382/255, 260–264, 266, 279
See application file for complete search history.

(56) References Cited

U.S. PATENT DOCUMENTS

| | | | |
|---|---|---|---|
| 5,561,611 A | 10/1996 | Avinash | |
| 5,790,709 A | 8/1998 | Kopeika | |
| 6,154,574 A | 11/2000 | Paik | |
| 6,470,097 B1 | 10/2002 | Lai | |
| 6,859,564 B2 | 2/2005 | Caron | |
| 6,928,182 B1 | 8/2005 | Chui | |
| 7,065,256 B2 * | 6/2006 | Alon et al. | 382/264 |
| 7,437,012 B2 * | 10/2008 | Carasso | 382/275 |
| 7,529,422 B2 * | 5/2009 | Wang et al. | 382/254 |
| 7,616,254 B2 * | 11/2009 | Wong et al. | 348/349 |
| 7,619,656 B2 * | 11/2009 | Ben-Ezra et al. | 348/208.4 |
| 2001/0013895 A1 * | 8/2001 | Aizawa et al. | 348/222 |
| 2007/0172141 A1 | 7/2007 | Bando | |

OTHER PUBLICATIONS

Fergus, Barun Singh, Aaron Hertzmann, Sam T. Roweis and William T. Freeman, "Removing Camera Shake from a Single Photograph", ACM Transactions on Graphics, vol. 25 Issue 3, Jul. 2006, pp. 787-794.*

Raanan Fattal, Dani Lischinski and Michael Werman, "Gradient Domain High Dynamic Range Compression", ACM Transactions on Graphics, vol. 21 Issue 3, Jul. 2002, pp. 249-256.*

Identification of a Class of Space-Variant Image Blurs, Ozkan et al., SPIE vol. 1452 Image Processing Algorithms and Techniques II, pp. 146-156, 1991.

Bayesian Wavelet-Based Image Deconvolution: A GEM Algorithm Exploiting a Class of Heavy-Tailed Priors, Bioucas-Dias, IEEE Transactions on Image Processing, vol. 15, No. 4, pp. 937-951, Apr. 2006.

* cited by examiner

*Primary Examiner* — Eric Rush

(74) *Attorney, Agent, or Firm* — Sprinkle IP Law Group

(57) ABSTRACT

An image processing device according to an example of the invention comprises a differentiating section which differentiates input image data to generate gradient image data, a gradient domain deconvolution processing section which applies a deconvolution to the gradient image data, the deconvolution performing deblurring corresponding to a prior distribution of an image gradient of an image to generate deconvolved data, and an integrating section which integrates the deconvolved data to generate deblurred image data.

15 Claims, 10 Drawing Sheets

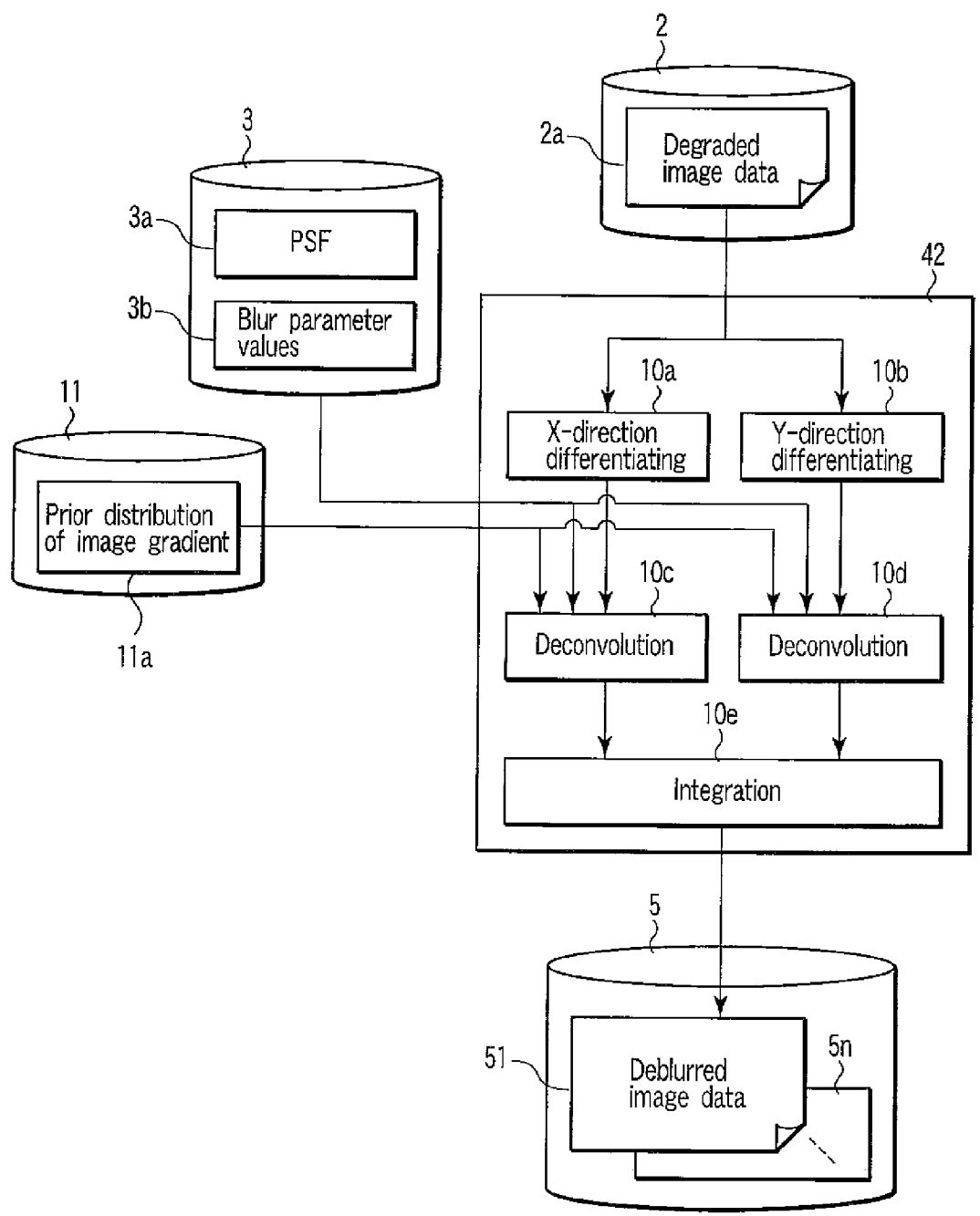
F I G. 3

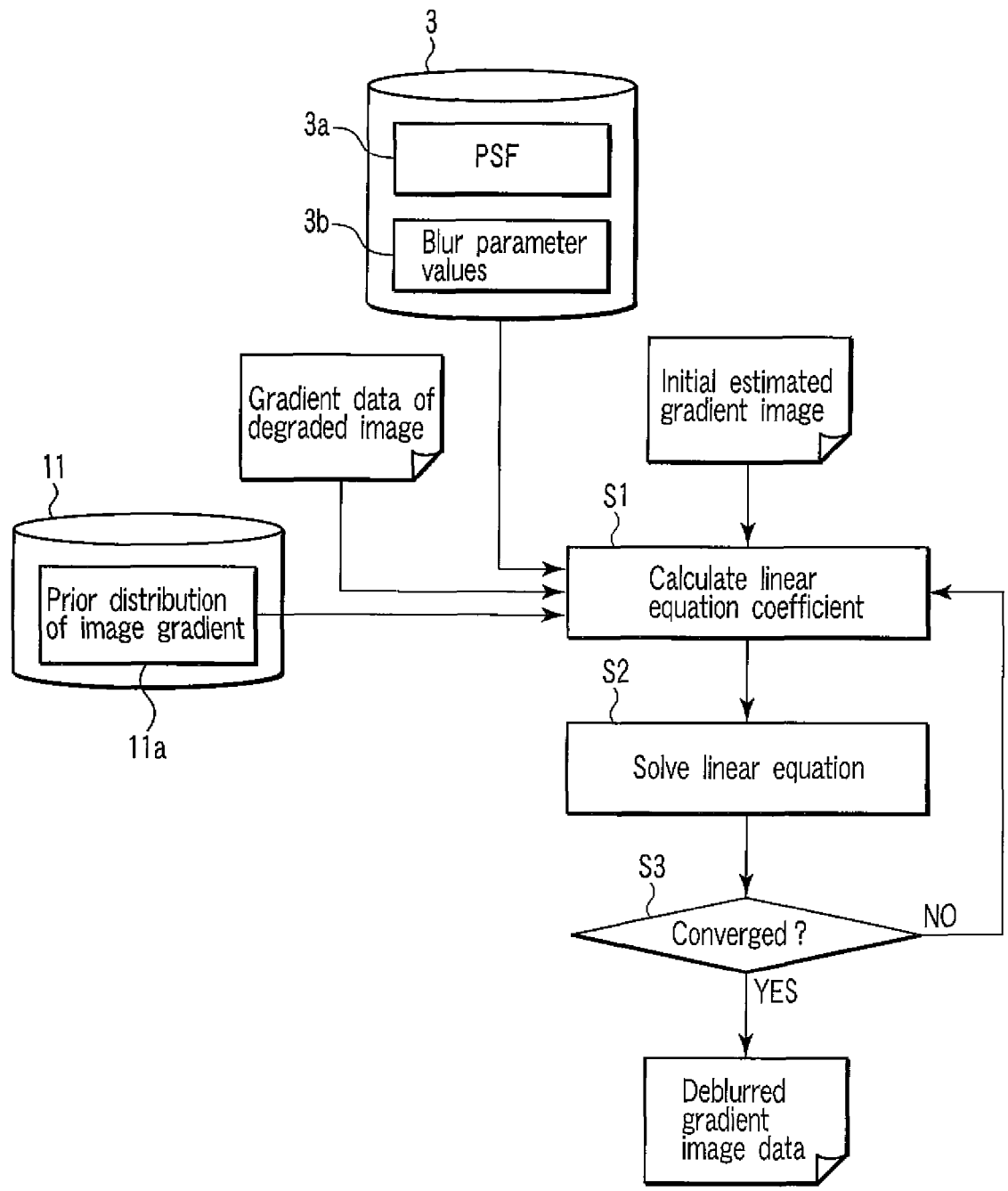
F I G. 4

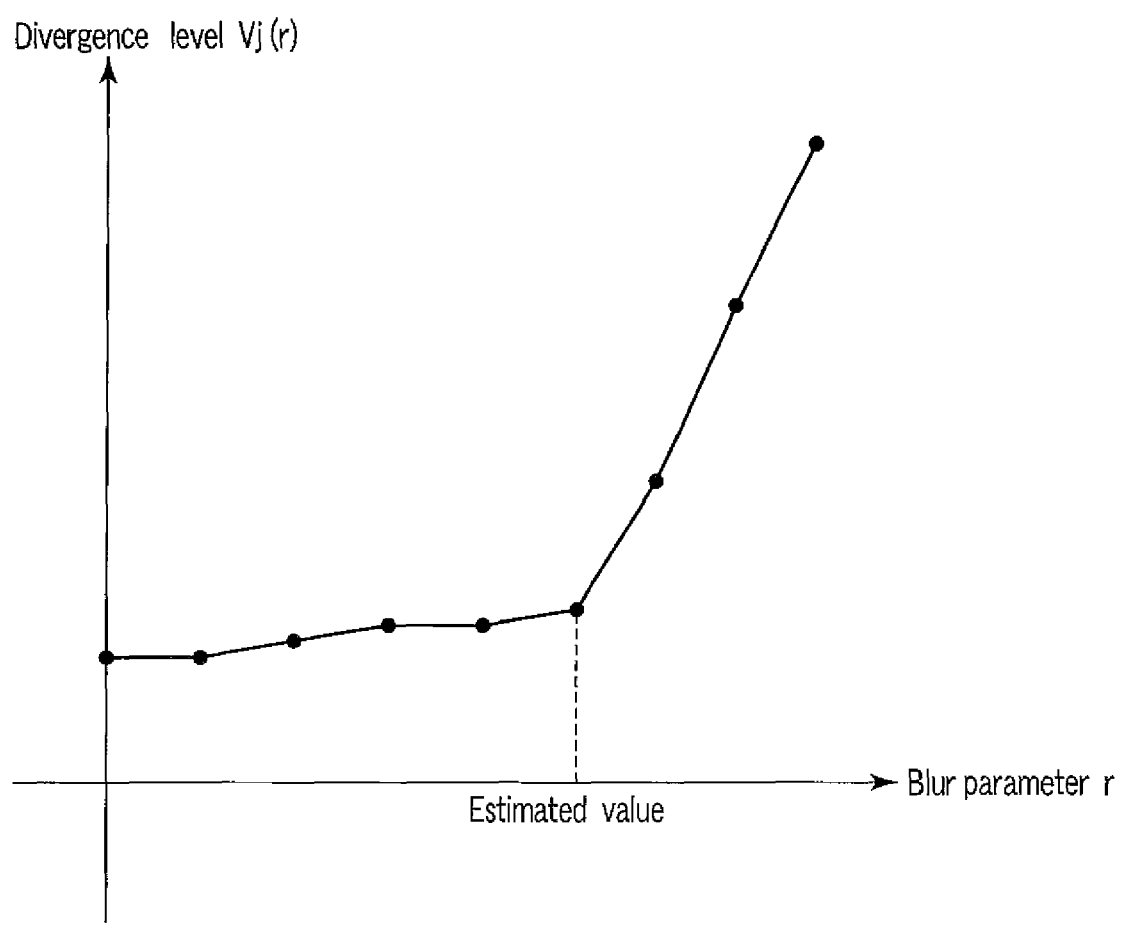
F I G. 11

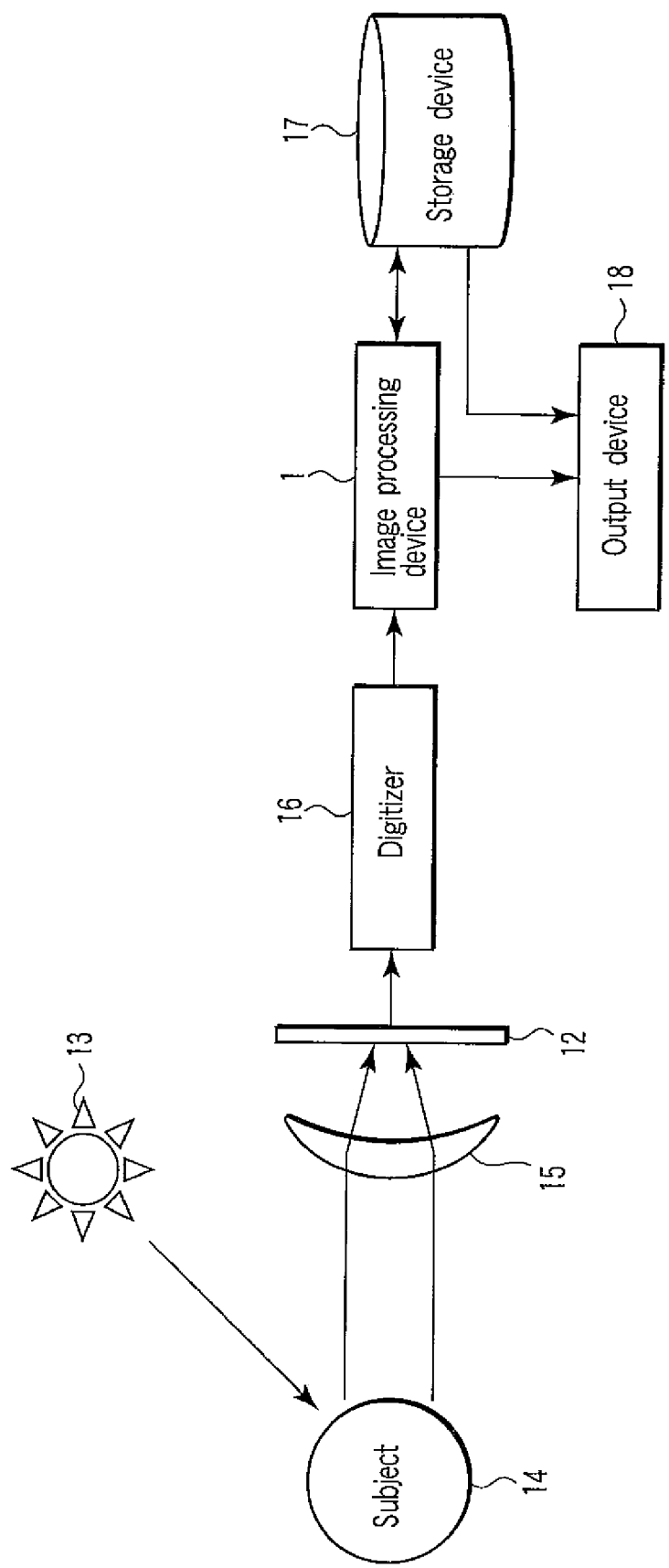
F I G. 12

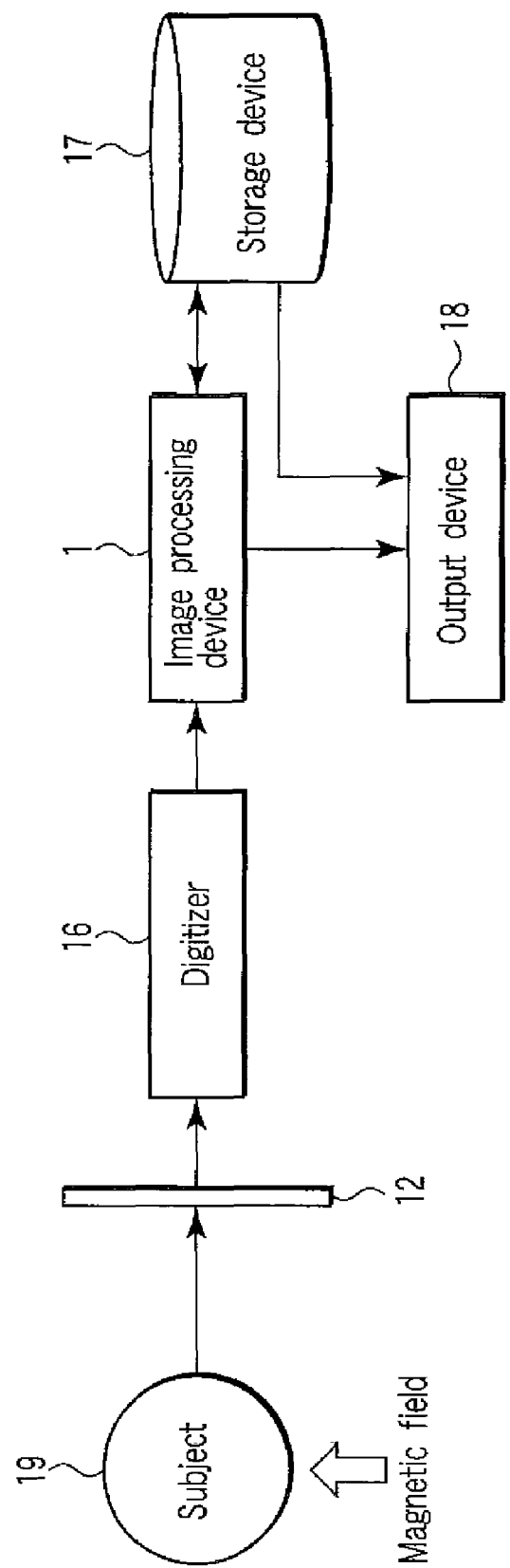
F I G. 13

DEVICE AND METHOD FOR GRADIENT DOMAIN IMAGE DECONVOLUTION

CROSS-REFERENCE TO RELATED APPLICATIONS

This application is based upon and claims the benefit of priority from prior Japanese Patent Application No. 2007-011878, filed Jan. 22, 2007, the entire contents of which are incorporated herein by reference.

BACKGROUND OF THE INVENTION

1. Field of the Invention

The present invention relates to an image processing device which converts a blur state within an image.

2. Description of the Related Art

A general method of restoring degraded image data is assumed to be executed in a circumstance that satisfies at least one of the following conditions (1) to (4).

(1) A point-spread function (PSF) of input degraded image data is uniform (for example, Document 1: U.S. Pat. No. 6,859,564, Document 2: U.S. Pat. No. 5,561,611, and Document 3: U.S. Pat. No. 6,154,574).

(2) The PSF for the degraded image data is not uniform but varies slowly (for example, Document 4: M. K. Ozkan, A. M. Tekalp, and M. I. Sezan. Identification of a class of space-variant image blurs, Proc. SPIE 1452, 146-156, 1991).

(3) The PSF is available from sources a path (for example, a prior knowledge, a sensor, or the like) other than the degraded image data (for example, Document 5: U.S. Pat. No. 5,790,709, Document 6: J. M. Biouca-Dias. Bayesian wavelet-based image deconvolution: a GEM algorithm exploiting a class of heavy-tailored priors. IEEE trans. Image Processing, 15(4), 937-951, 2006).

(4) A plurality of image data are available (for example, Document 7: U.S. Pat. No. 6,470,097).

On the basis of a model assuming that input image data is obtained by applying the PSF to clear original image data, all the methods listed above estimate the original image data from the input image data. If the PSF is unknown in advance, the PSF is also to be estimated. This problem is called blind image deconvolution/restoration. Documents 1 to 3, described above, disclose techniques for blind deconvolution for the PSF that is uniform in the whole image data.

Document 4 discloses a technique of dividing an image into rectangles and performs a blur estimation on an assumption that the PSF is uniform within each rectangle; the technique can deal with a nonuniform PSF provided that the PSF varies slowly over an image.

Document 5 restores image data by acquiring the PSF from a sensor. Even if the PSF is available or is known in advance, deblurring is generally an ill-posed problem. Deblurring tends to amplify noise. As a method for preventing noise amplification, Document 6 discloses a method for deblurring image data using a given uniform PSF which suppresses possible noise amplification by applying a prior distribution to a wavelet coefficient of an image.

Document 7 discloses a method of using a plurality of images.

Document 8 (U.S. Pat. No. 6,928,182) discloses a technique for edge sharpening by estimating a blur around an edge detected in single image data and moving a luminance value from one side to the other side of the edge.

Image data to be deblurred often satisfies none of the conditions (1) to (4).

If none of the conditions (1) to (4) are satisfied, using of the techniques in Documents 1 to 8 is difficult.

Document 4 uniformly divides the image data into rectangular areas independently of a content of image data (subject in the image data). This technique is thus effective if the blur varies slowly (moderately) in the image data.

However, if blur variation in the image data is large, for example, if the amount of blur varies among a plurality of subjects with arbitrary shapes in the image data, the using of the technique in Document 4 is difficult. If the blur variation in the image data is intense, it is difficult to use the techniques in Documents 1 to 3, which are based on the condition that the blur is uniform.

The technique in Document 6 requires that the PSF is uniform and given as input. It is difficult to directly apply the technique in Document 6 if the blur variation in the image data is large. Furthermore, the technique in Document 6 suppresses possible noise amplification associated with deblurring. However, a block pattern may appear in restored image data owing to a character of the wavelet transform. Much calculation time is required to compensate (correct) for the block pattern.

The main object of the technique in Document 8 is sharpening, and the technique is thus insufficient for deblurring.

BRIEF SUMMARY OF THE INVENTION

An image processing device according to an example of the invention comprises a differentiating section which differentiates input image data to generate gradient image data; a gradient domain deconvolution processing section which applies a deconvolution to the gradient image data, the deconvolution performing deblurring corresponding to a prior distribution of an image gradient of an image to generate deconvolved data; and an integrating section which integrates the deconvolved data to generate deblurred image data.

BRIEF DESCRIPTION OF THE SEVERAL VIEWS OF THE DRAWING

FIG. 3 is a block diagram showing an example of a process of a deconvolution processing section in accordance with the first embodiment.

FIG. 4 is a flowchart showing an example of a deconvolution process executed by the deconvolution section in accordance with the first embodiment.

FIG. 11 is an example of a relationship between divergence levels and blur parameter values.

FIG. 12 is a block diagram showing a first example of an application of an image processing device in accordance with the second embodiment.

FIG. 13 is a block diagram showing a second example of an application of the image processing device in accordance with the second embodiment.

DETAILED DESCRIPTION OF THE INVENTION

Embodiments of the present invention will be described below with reference to the drawings.
(First Embodiment)

An image processing device in accordance with the present embodiment deblurs image data.

The image processing device in accordance with the present embodiment performs different deblurring operations for the input image data, divides the image data into appropriate areas in accordance with an image content of the image data, performs a local blur estimation for each area, and unites the appropriately deblurred image data for each area. Thus, even if a state of a blur within single image data is not uniform, particularly, even if a variation of the blur state within the single image data is large, the image processing device can generate varied image data with a different blur state, at a high speed, while preventing possible noise amplification.

Figure 1:
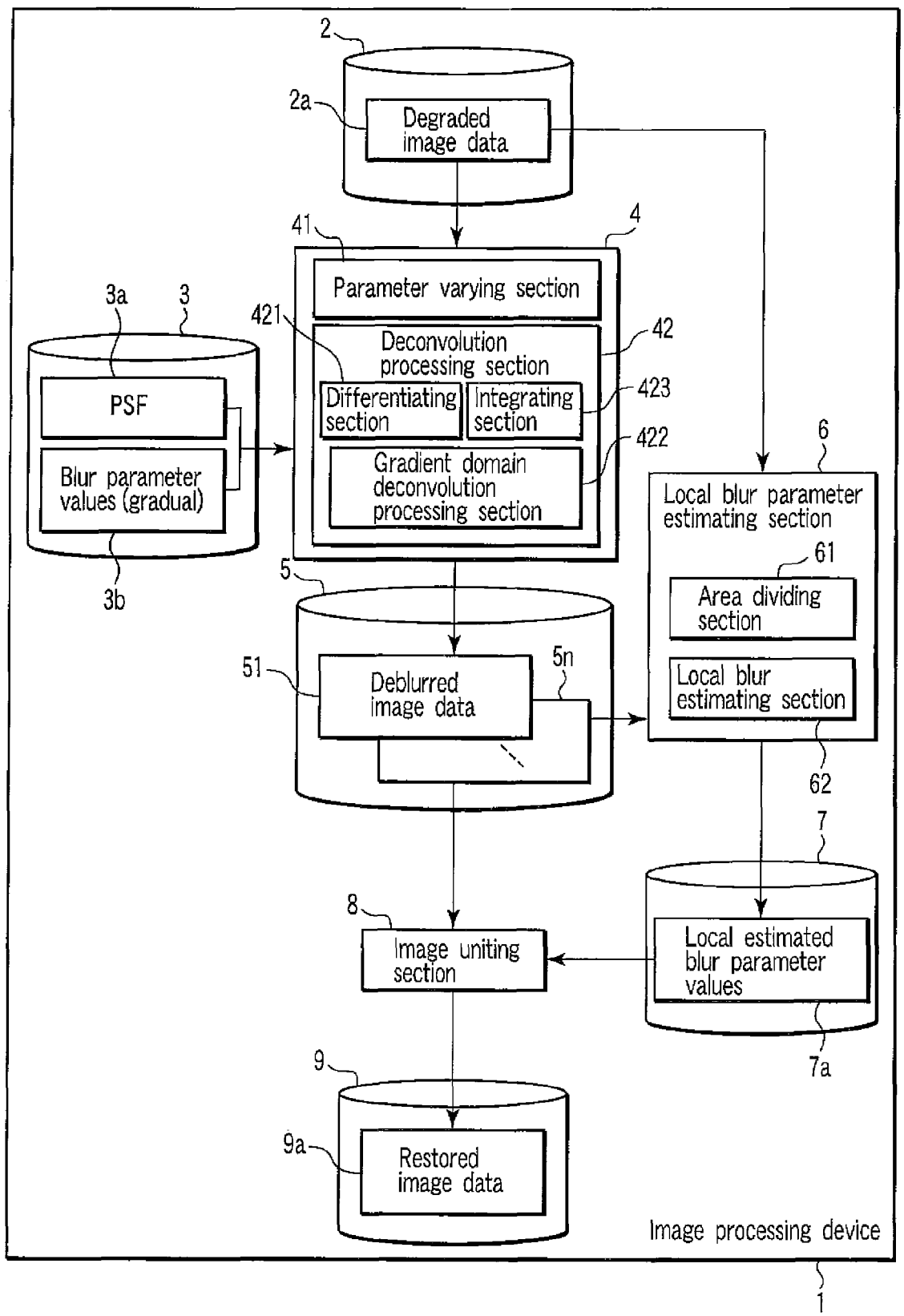
FIG. 1 is a block diagram showing an example of an image processing device in accordance with the first embodiment.

FIG. 1 is a block diagram showing an example of the image processing device in accordance with the present embodiment. In the present embodiment, input image data is degraded image data 2a and output image data is restored image data 9a. However, input image data may be image data in one blur state may be input image data, and output image data may be image data in another blur state. That is, the image processing device 1 in accordance with the present embodiment may output image data in a desired blur state.

The image processing device 1 in accordance with the present embodiment comprises a degraded image storage device 2, a PSF model storage device 3, a deconvolution section 4, a deblurred image storage device 5, a local blur parameter estimating section 6, a local estimated blur parameter storage device 7, an image uniting section 8, and a restored image storage device 9.

In the present embodiment, degraded image data 2a stored in the degraded image storage device 2 is in a non-uniform blur state. However, the degraded image data 2a may be in a uniform blur state.

The PSF model storage device 3 stores a PSF 3a (blur function) that models a blur state and a plurality of blur parameter values 3b to be applied to the PSF 3a.

The deconvolution section 4 reads the degraded image data from the degraded image storage device 2. For the plurality of levels, the deconvolution section 4 generates, from the degraded image data 2a, deblurred image data 51 to 5n which are generated by removing the PSF 3a with the respective blur parameter values for the respective levels. The deconvolution section 4 stores the resultant deblurred image data 51 to 5n corresponding to the respective levels in the deblurred image storage device 5.

The local blur parameter estimating section 6 reads the degraded image data 2a from the degraded image storage device 2. An area dividing section 61 of the local blur parameter estimating section 6 divides the degraded image data 2a into a plurality of areas on the basis of a content of an image, for example, a variation in color.

The local blur parameter estimating section 6 reads the deblurred image data 51 to 5n corresponding to the respective levels. For the plural areas, a local blur estimating section 62 of the local blur parameter estimating section 6 selects one of the deblurred image data which satisfies a predetermined appropriate condition in the areas from the deblurred image data 51 to 5n for the respective levels. The local blur estimating section 62 estimates local estimated blur parameter values 7a for identifying deblurred image data selected for the respective area.

The local blur parameter estimating section 6 stores the local estimated blur parameter values 7a estimated for the respective areas in the local estimated blur parameter storage device 7.

The image uniting section 8 reads the deblurred image data 51 to 5n for the respective levels and the local estimated blur parameter values 7a for the respective areas. For the respective areas, the image uniting section 8 extracts appropriate area data from the deblurred image data corresponding to the local estimated blur parameter values estimated for the respective areas. The image uniting section 8 combines the extracted appropriate image data for the respective areas to generate restored image data 9a. The image uniting section 8 stores the restored image data 9a in the output image storage device 9.

Details of the image processing device 1 in accordance with the present embodiment will be described below.

The deconvolution section 4 in FIG. 1 comprises a parameter varying section 41 and a deconvolution processing section 42. The deconvolution processing section 42 comprises a differentiating section 421, a gradient domain deconvolution processing section 422, and an integrating section 423. The deconvolution section 4 performs a deconvolution on the degraded image data 2a assuming that the blur in the degraded image data 2a is uniform. The PSF 3a is parameterized by the amount of a blur. The parameter varying section 41 of the deconvolution section 4 varies values of a parameter r of PSF 3a in sequence, for example, r=0.5, 1.0, 1.5, 2.0, . . . in accordance with the blur parameter values 3b.

The deconvolution section 4 generates the deblurred image data 51 to 5n corresponding to respective blur parameter values, for example, deblurred image data as the result of the deconvolution using PSF 3a with the blur parameter r=0.5 and deblurred image data as the result of the deconvolution using PSE3a with the blur parameter for r=1.0.

Various functions may be used as the PSF 3a parameterized by the amount of the blur. A Gaussian distribution whose standard deviation r is regarded as a blur parameter can be used as a model of the PSF in many fields such as magnetic resonance imaging (MRI) and computed tomography (CT).

Equation (1) expresses a Gaussian distribution whose standard deviation r is regarded as the blur parameter.

$$h(x,y)=\exp(-(x^2+y^2)/2r^2)/(2\pi r^2) \quad (1)$$

Equation (1) is generalized into Equation (2) in for a frequency domain.

$$F[h](\xi,\eta)=\exp(-r^2(\xi^2+\eta^2)^b) \quad (2)$$

F[h] denotes a Fourier transform of PSF h and is called an optical transfer function (OTF).

$\xi$ and $\eta$ denote spatial frequencies. For b=1, Equation (2) corresponds to Equation (1). For b=5/6, the Equation (2) is a model of the PSF/OTF for an atmospheric turbulence. For b=1/2, the equation (2) is a model of the PSF/OTF for X ray scattering.

For defocus blur associated with a lens in a camera or the like, the PSF is expressed by Equation (3) using a radius of the blur as a blur parameter.

$$h(x,y)=1/(\pi r^2) \text{ For } x^2+y^2 \leq r^2 \quad h(x,y)=0 \text{ For other cases} \quad (3)$$

Furthermore, any PSF is defined when r is a scaling parameter that magnifies or minifies a certain basic PSF q(x, y).

$$h(x,y)=q(x/r,y/r)/\int q(x/r,y/r)dxdy \qquad (4)$$

The basic PSF is obtained by, for example, calibration.

The deconvolution process executed by the deconvolution processing section 42 uses an image data degradation model such as Equation (5).

$$g=Hf+n \qquad (5)$$

In the Equation (5), g, f, and n denote the degraded image data 2a, original clear data, and noise, respectively; discrete pixel values are arranged in lexicographic order and expressed as vectors.

H denotes a matrix expressing a two-dimensional convolution based on PSF h(x, y). The deconvolution corresponds to an estimation of the original image data f from the given degraded image data g and blur matrix H. The deconvolution is known to be an ill-posed problem. When the problem is solved as a least square problem simply by minimizing $|g-Hf|^2$, noise is expanded in the resultant image data even if the accurate blur matrix H is used.

To prevent possible noise expansion, it is necessary to use a prior knowledge of the original image data f. A following prior knowledge is used: a distribution of a luminance gradient in natural image data is generally as shown by a solid line in FIG. 2. The distribution of the luminance gradient in the natural image data generally has a narrower peak and a wider foot than a Gaussian distribution widely used (shown by a dashed line in FIG. 2). The distribution of the luminance gradient in the natural image data is modeled by Equation (6) as a generalized Laplacian distribution.

$$p(u) \propto \exp(-\alpha|u|^\beta)\ 0<\beta<1 \qquad (6)$$

The distribution expressed by Equation (6) is called a prior distribution of an image gradient. The prior distribution of the image gradient is applied to a luminance gradient, that is, differentiation coefficients of the image. Thus, Equation (6) is differentiated and an image degradation model is transformed into Equations (7) and (8).

$$g_x=Hf_x+n_x \qquad (7)$$

$$g_y=Hf_y+n_y \qquad (8)$$

Here, subscripts x and y denote the differentials of respective directions. nx and ny denote noise in a gradient domain, which is generally different from a noise n in the original image area.

gx and gy are obtained by differentiating the degraded image data g.

To solve Equations (7) and (8) for fx and fy, an estimated value f^x for the x differential of the original image data and an estimated value f^y for the y differential of the original image data are obtained. The estimated value f^x of the x differential and the estimated value f^y of the y differential are integrated to obtain an estimated value f^ for the original image data. The integration may be performed by solving a Poisson equation in Equation (9).

$$(\partial^2/\partial x^2+\partial^2/\partial y^2)f^=\partial f^_x/\partial x+\partial f^_y/\partial y \qquad (9)$$

The deconvolution processing section 42 executes a process shown in FIG. 3.

That is, the differentiating section 421 of the deconvolution processing section 42 executes a process 10a of differentiating the input image data 2a in an x direction and a process 10b of differentiating the input image data 2a in a y direction.

Then, the gradient domain deconvolution processing section 422 of the deconvolution processing section 42 executes a process 10c of performing a deconvolution on the x direction differential of the input image data 2a and a process 10d of performing a deconvolution on the y direction differential of the input image data 2a. The processes 10c and 10d are executed step by step on the basis of the stepwise blur parameter values 3b obtained by the parameter varying section 41, the PSF 3a, and the prior distribution of the image gradient 11a stored in the storage device 11. The gradient domain deconvolution processing section 422 executes a process so that the image data resulting from the is deconvolution process follows the prior distribution of the image gradient 11a (a statistical distribution of the image gradient) (this process imposes a restriction such that the image data follows the prior distribution of the image gradient 11a as precisely as possible).

The integrating section 423 of the deconvolution processing section 42 executes a process 10e of obtaining the deblurred image data 51 to 5n for the respective levels of the blur parameter values 3b by integrating a result of a deconvolution of a x direction differential of the degraded image data 2a and a result of a deconvolution of a y direction differential of the degraded image data 2a.

A deconvolution process executed by the gradient domain deconvolution processing section 422 corresponds to deconvolution based on the differentiated image degradation mode of Equations (7) and (8).

Equations (7) and (8) can be similarly handled (processed). Thus, only a deconvolution in accordance with Equation (7) will be described, and a description of the deconvolution in accordance with Equation (8) is omitted.

When a noise n'x is assumed to be a Gaussian noise with a variance σ2, Equation (10) expresses a conditional probability of the x differential fx of the original image data with the x differential gx of the degraded image data 2a given.

$$p(f_x|g_x) \propto p(g_x|f_x)p(f_x) \propto \exp(-|g_x-Hf_x|^2/(2\sigma^2))\Pi ip(f_{x,i}) \qquad (10)$$

In this Equation, p(•) denotes a probability density function for an augment variable, and fx,i denotes the ith pixel value for the x differential fx of the original image data. It is assumed that the prior distribution of the image gradient can be applied to each pixel.

Using maximum a posteriori estimation (MAP estimation) taking fx that maximizes Equation (10) as an estimated value, Equation (11) is obtained because a position of a maximum value is invariable even when a logarithm (ln) is taken.

$$f^_x\mathrm{argmax}(-|g_x-Hf_x|^2/(2\sigma^2)+\Sigma i\ln p(f_{x,i})) \qquad (11)$$

Equation (11) is a linear equation when the prior distribution of the image gradient p(fx,i) is a Gaussian distribution commonly used. However, the Gaussian distribution has the effect of smoothing the whole image data and may be improper for a purpose of deblurring to restore clear image data. The present embodiment thus uses the distribution shown by the solid line in FIG. 2.

Figure 2:
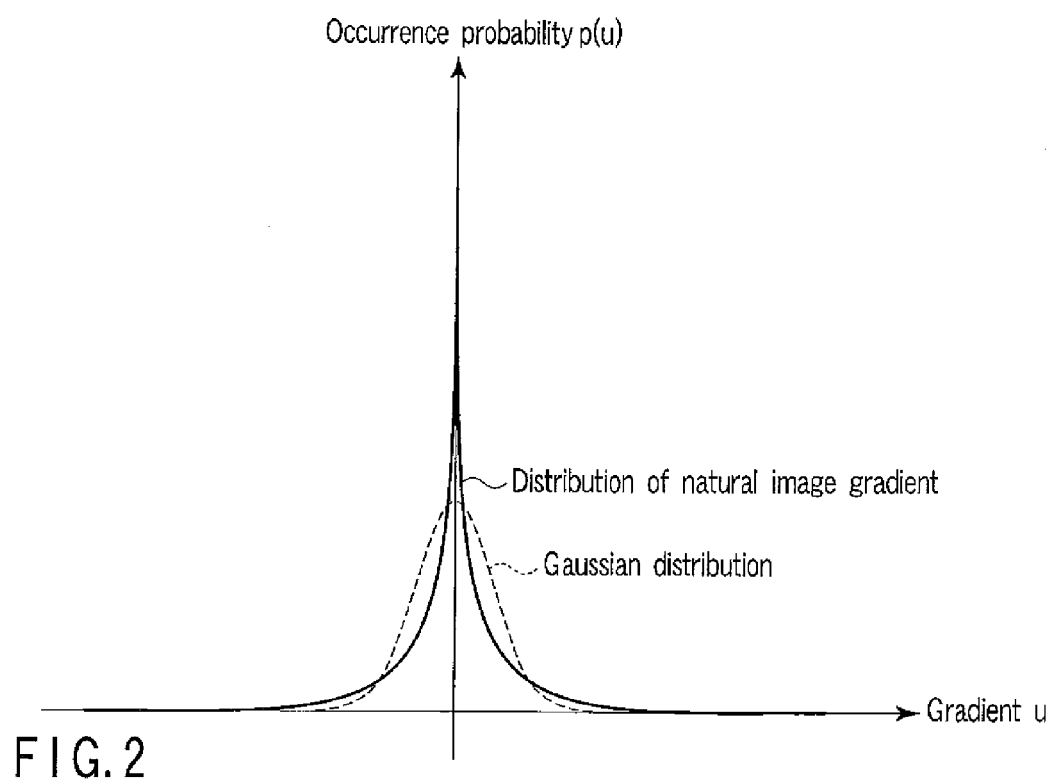
FIG. 2 is a graph showing an example of a distribution of an image gradient in natural image data and a Gaussian distribution for comparison.

Equation (11) is a nonlinear optimization problem when the solid line in FIG. 2 is used for the prior distribution of the image gradient p(fx,i). In the present embodiment, a speed of a process increases by transforming Equation (11) into an iterative linear equation using an expectation maximization (EM) method.

Description will be given below of an application, to gradient image data, of the EM method used for wavelet coefficients in Document 6.

First, the prior distribution of the image gradient p(fx,i) is expressed as a combination of Gaussian distributions with an average of 0 and different variances. That is, in Equation (12), p(fx,i|zi) denotes a Gaussian distribution with an average 0 and a variance zi, and p(zi) denotes a probability distribution of the variance zi.

$$p(f_{x,i}) = \int p(f_{x,i}|z_i)p(z_i)dz_i \quad (12)$$

Using the EM method with {zi} considered to be missing (unobservable) data, Equation (11) is transformed into an iterative update equation of an estimated value as Equation (13). An estimated value of fx in the n-th iteration is denoted as $f^{(n)}x$.

$$f^{(n+1)}x = \arg\max(-|g_x - Hf_x|^2/(2\sigma^2) + \Sigma_i E^{(n)}_i[\ln p(f_{x,i}|z_i)]) \quad (13)$$

$E^{(n)}_i[.]$ denotes an expected value based on the probability distribution p(zi|f(n)x,i) of the variance zi for the i-th gradient. The second term of Equation (13) is expressed by Equation (14) because p(fx,i|zi) denotes the Gaussian distribution.

$$E^{(n)}_i[\ln p(f_{x,i}|z_i)] = E^{(n)}_i[-f^2_{x,i}/(2z_i)] = -(f^2_{x,i}/2)E^{(n)}_i[1/z_i] \quad (14)$$

And Equation (15) is given.

$$E^{(n)}_i[1/z_i] = -1/(f^{(n)}_{x,i} p(f^{(n)}_{x,i})) dp(f^{(n)}_{x,i})/df^{(n)}_{x,i} \quad (15)$$

If for example, the prior distribution of the image gradient shown in Equation (6) is used, then specifically, Equation (15) is transformed into Equation (16).

$$E^{(n)}_i[1/z_i] = \alpha\beta|f^{(n)}_{x,i}|^{\beta-2} \quad (16)$$

Thus, Equation (13) is a quadratic equation with respect to fx and can be maximized by solving the linear Equation (17) for fx.

$$(\sigma^2 D^{(n)} + H^T H)f_x = H^T g_x \quad (17)$$

In this equation, $D^{(n)}$ denotes a diagonal matrix having $E^{(n)}_i[1/zi]$ shown in Equation (15) as a diagonal element. $H^T$ denotes a transposition of the blur matrix H.

FIG. 4 shows an example of the deconvolution processes 10c and 10d in FIG. 3 for the gradient image data of the degraded image data.

That is, in the n-th iteration, on the basis of the current estimated deblurred gradient image data $f^{(n)}x$, the gradient domain deconvolution processing section 422 calculates the matrix $D^{(n)}$ having the diagonal component calculated in accordance with Equation (15). The gradient domain deconvolution processing section 422 thus calculates a coefficient $(\sigma^2 D^{(n)} + H^T H)$ and $H^T gx$ of the linear equation (17) (step S1).

The gradient domain deconvolution processing section 422 solves the linear Equation (17) (step S2).

Similarly, steps S1 and S2 are executed on new estimated deblurred gradient image data $f^{(n+1)}x$.

The gradient domain deconvolution processing section 422 starts with initial estimated deblurred gradient image data $f^{(0)}x$ and repeats the above-described process until a variation in estimated values is smaller than a predetermined value. The gradient domain deconvolution processing section 422 then outputs a final estimated value as deblurred gradient image data (step S3).

To solve the linear equation, for example, a conjugate gradient method or a second order stationary iterative method may be used. A main process for the solution is the calculation of the product of the blur matrix H and a vector, and the product of the transposition $H^T$ of the blur matrix H and a vector. The product of the blur matrix H and the vector, and the product of the transposition $H^T$ and the vector can be calculated at a high speed using a fast Fourier transform.

The gradient data gx of the degraded image data can be used as an initial estimated gradient image data $f^{(0)}x$.

The variance $\sigma^2$ of noise can be estimated from the gradient data gx of the degraded image data. Alternatively, $\sigma^2$ may be considered to be a weighting coefficient for the prior distribution term of Equation (17) so that an appropriate value may be set for $\sigma^2$. An increase in the value of $\sigma^2$ reduces the amount of noise in the restored image data. However, an excessively large value of $\sigma^2$ may result in unclear restored image data. An effective method for achieving both noise reduction and image clarification is to set a large initial value for $\sigma^2$ and then to reduce the value for each iteration of the deconvolution calculation.

The deconvolution process executed by the gradient domain deconvolution processing section 422 has been described for the case of a gray scale image in which each pixel has a single color channel. To deconvolve a color image, a similar process can be repeated for each color channel.

In the image processing device 1, while the deconvolution section 4 is executing the process, the local blur parameter estimating section 6 in FIG. 1 determines r(x, y) which is the local estimated blur parameter value for each pair of coordinates (x, y).

Figure 5:
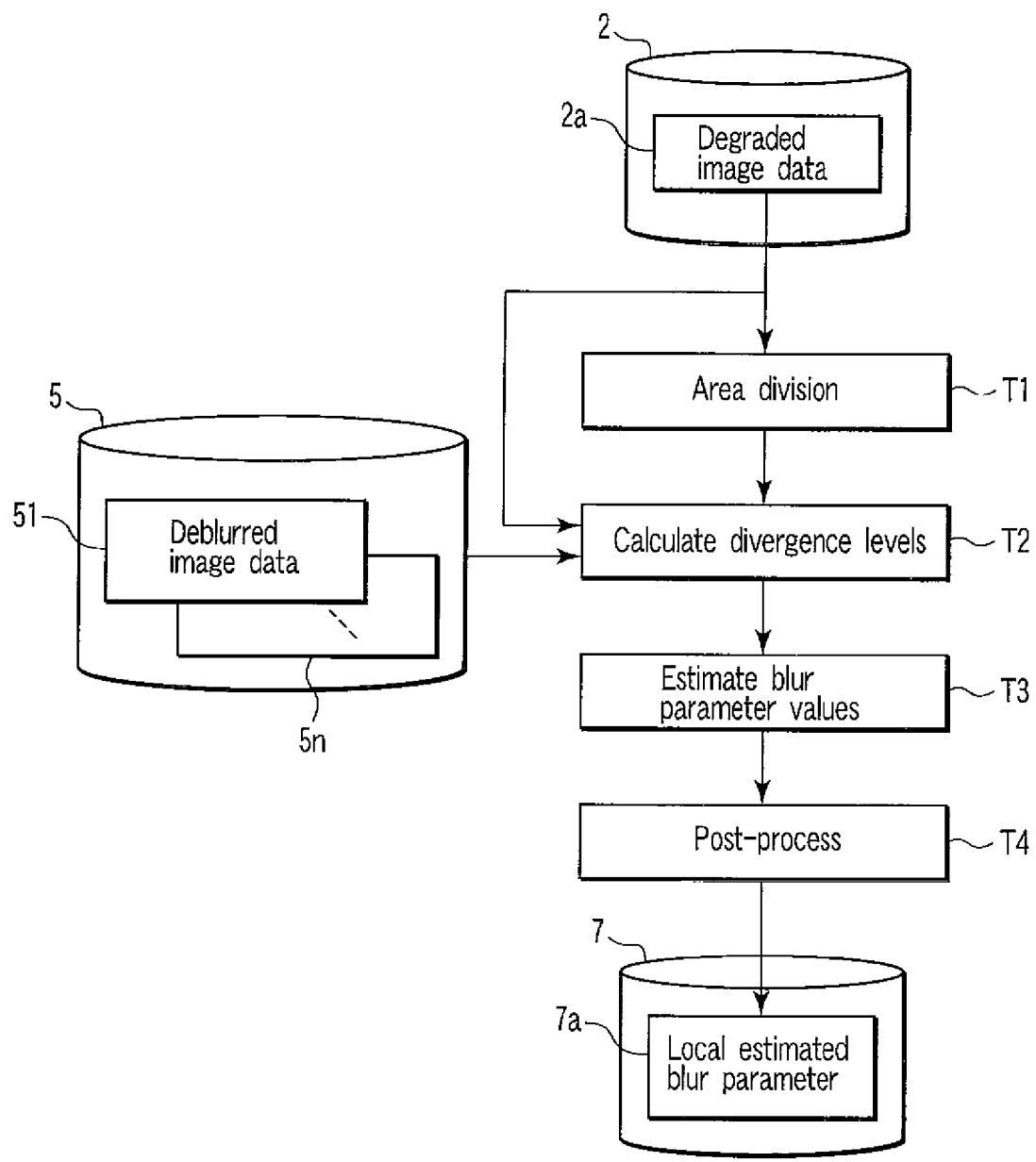
FIG. 5 is a block diagram showing an example of a process of a local blur parameter estimating section in accordance with the first embodiment.

FIG. 5 shows an example of a process executed by the local blur parameter estimating section 6.

In step T1, the local blur parameter estimating section 6 divides the degraded image data 2a into a plurality of areas in accordance with the content of the image data.

In step T2, the local blur parameter estimating section 6 determines values (divergence levels) that are measures of the appropriateness of the deblurring effect for each area on the basis of the plurality of deblurred image data 51 to 5n. Here, as described below, the divergence level refers to the appearance of noise or a periodic pattern and represents the level of the deviation of the deblurring effect from a general natural image. That is, in the present embodiment, a judge which determines whether or not the deblurring satisfies an appropriate condition on the basis of the state of the divergence levels is executed for each area.

In step T3, for each area, the local blur parameter estimating section 6 estimates (selects) a blur parameter value resulting in the best deblurring effect, on the basis of the divergence levels.

In step T4, the local blur parameter estimating section 6 executes a post-process such as interpolation of the blur parameter value for areas for which the blur parameter value has not been estimated or smoothing of the blur parameter values among the areas on the basis of the estimated blur parameter for each area.

Figure 6:
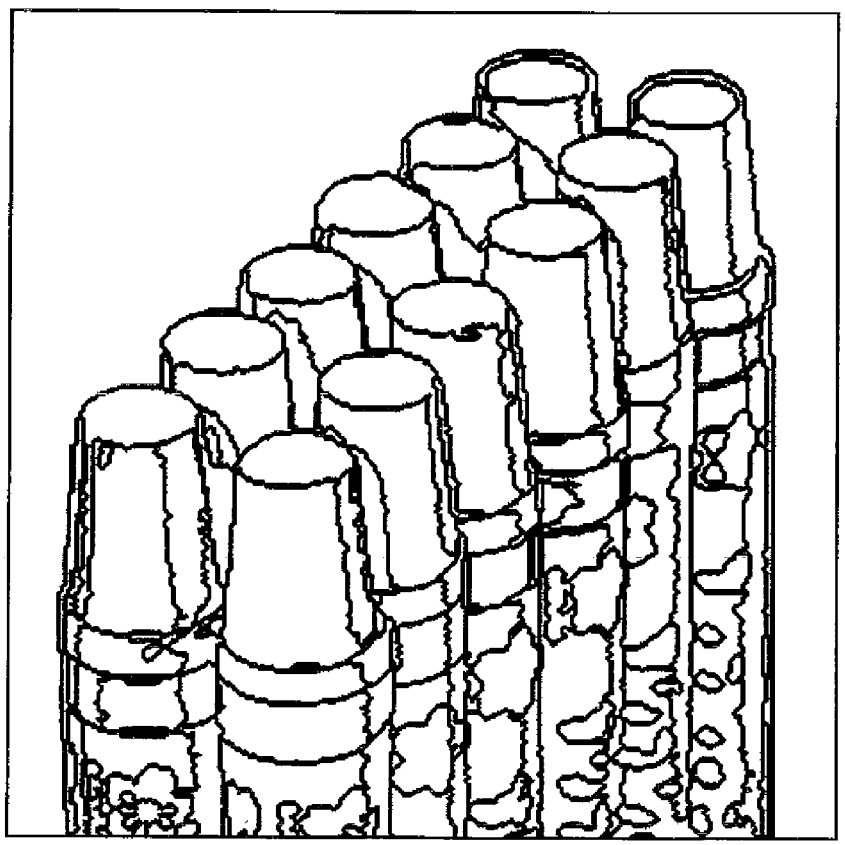
FIG. 6 is an example of a result of an area division in accordance with the first embodiment.

In step T1 executed by the local blur parameter estimating section 6, the degraded image data 2a may be divided into areas by, for example, collecting pixels with similar colors together. FIG. 6 shows an example of the result of the area division of the image data based on the content of the image data. Any method may be used to divide the degraded image data 2a into appropriate areas; for example, the degraded image data 2a may be simply divided into rectangular areas. The division based on the content of the image makes it possible to improve the accuracy of the estimation of the blur parameter value. The shape of the area is not limited. An excessively small area has a small number of pixels, so that a sufficient number of samples cannot be extracted from such an area. Thus, such a small area may be merged with some of surrounding areas or may be omitted from the estimation target. An excessively large area offers a low estimation locality and may thus be appropriately divided into smaller areas. The reliability of the estimation may be improved by excluding elongate areas, areas with slight variation in pixel values, areas with a saturated pixel value, and the like.

When areas resulting from division are denoted as Aj and the area of the whole degraded image data 2a is denoted as I, Equations (18) and (19) are given.

$$U_j A_j = I \quad (18)$$

$$A_j \cap A_k = \Phi \text{ For } j \neq k \quad (19)$$

Blur estimation is performed on the assumption that the blur parameter value is fixed within each area Aj. The present embodiment estimates the blur parameter value corresponding to one of the deblurred image data 51 to 5n which corresponds to the best restoration result within that area. For example, if the plurality of deblurred image data 51 to 5n result from deconvolution with the blur parameter r=0.5, 1.0, 1.5, 2.0, . . . and the true blur parameter for an area of interest is r=1.6, one of the plurality of deblurred image data 51 to 5n which results from deconvolution with the blur parameter r=1.5 is expected to most appropriately restore the area of interest. Thus, if the appropriateness of the restoration results can be judged, the blur parameter value for the area of interest in this example can be estimated as r=1.5. The estimated value of the blur parameter is selected from the predetermined blur parameter values. Accordingly, a set of blur parameter values needs to be prepared depending on a required accuracy.

The divergence level of the image data is used as a measure of the appropriateness of the restoration result. The divergence means that a periodic pattern not contained in the original image data or random noise appears in the deblurred image data. The divergence level indicates the magnitude of the random noise or the periodic pattern not contained in the original image data. The divergence level can be evaluated on the basis of a measure such as any of Equations (20) to (23) where the deblurred image data is denoted as f^.

Sum of squares of pixel values:

$$\Sigma i (f^\wedge_i)^2 \quad (20)$$

Sum of squares of luminance gradients:

$$\Sigma i (f^\wedge_{x,i})^2 + (f^\wedge_{y,i})^2 \quad (21)$$

Sum of squares of Laplacian coefficients:

$$\Sigma i (f^\wedge_{xx,i} + f^\wedge_{yy,i})^2 \quad (22)$$

Number of pixels exceeding range of pixel value $$\Sigma i \delta (f^\wedge_i \in [\theta_{min}, \theta_{max}]) \quad (23)$$

In these equations, f^xx and f^yy denote second-order differentials for x and y in the deblurred image data. δ(•) denotes a function that returns 1 when the augment is true and 0 when the augment is false. [θmin, θmax] denotes the possible range of the pixel value.

When a true blur parameter value is rt and if a deconvolution is performed with the blur parameter r, the deblurred image data has a relatively low divergence level for r≦rt. However, for r>rt, the divergence level increases abruptly as r increases. The reason will be explained below.

An increase in the value of the blur parameter r attenuates a high-frequency component of the image data blurred by the PSF with the blur parameter value.

For example, a graph of the PSF in Equation (1) in the frequency domain is obtained by setting b=1 for Equation (2).

Figure 7:
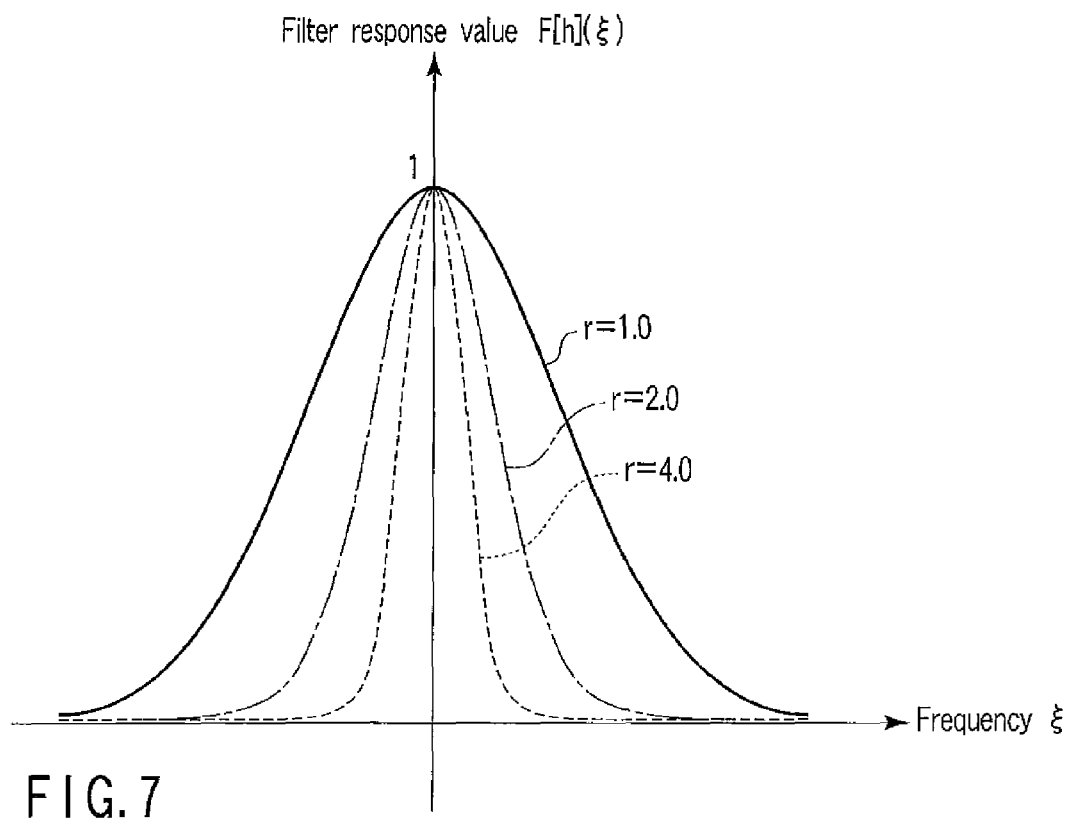
FIG. 7 is a graph one-dimensionally showing a PSF in a frequency domain in Equation (2) with b=1.

FIG. 7 shows an example in which a graph obtained by Equation (2) with b=1 is one-dimensionally shown for simplification.

FIG. 7 shows that the magnitude of the attenuation of the high-frequency component increases as the value of the blur parameter r increases. The deconvolution corresponds to a process of amplifying the attenuated frequency component. Thus, when the value of the blur parameter becomes large, even a low frequency component is amplified greatly.

Consequently, for r<rt, a level of an amplification resulting from a deconvolution is lower than a level of an attenuation resulting from the true blur parameter value rt. The deblurred image data thus still has a smaller high-frequency component than the original image data.

In contrast, for r>rt, the level of the amplification resulting from deconvolution is higher than the level of the attenuation resulting from the true blur parameter value rt. The deblurred image data thus has a greater high-frequency component than the original image data, resulting in divergence.

For r=rt, ideally, the attenuation by the true blur parameter value rt is cancelled by the deconvolution, and the original image data is restored. In actuality, even for r≦rt, noise is also amplified to cause a certain level of divergence depending on the noise level. However, if the noise level is sufficiently lower than the content of an image, the divergence is sufficiently small compared to the divergence for r>rt.

For simplification of description, it is assumed that the original image data f is blurred using a Gaussian distribution with the blur parameter value rt and that the resultant image data is deconvolved using a Gaussian distribution with the blur parameter value r. A simple inverse filter is used with noise neglected to obtain the relationship expressed by Equation (24).

$$F[f^\wedge](\xi,\eta) = F[f](\xi,\eta) \exp(-r_t^2(\xi^2+\eta^2))/\exp(-r^2(\xi^2+\eta^2))$$
$$= F[f](\xi,\eta) \exp(-(r_t^2-r^2)(\xi^2+\eta^2)) \quad (24)$$

Figure 8:
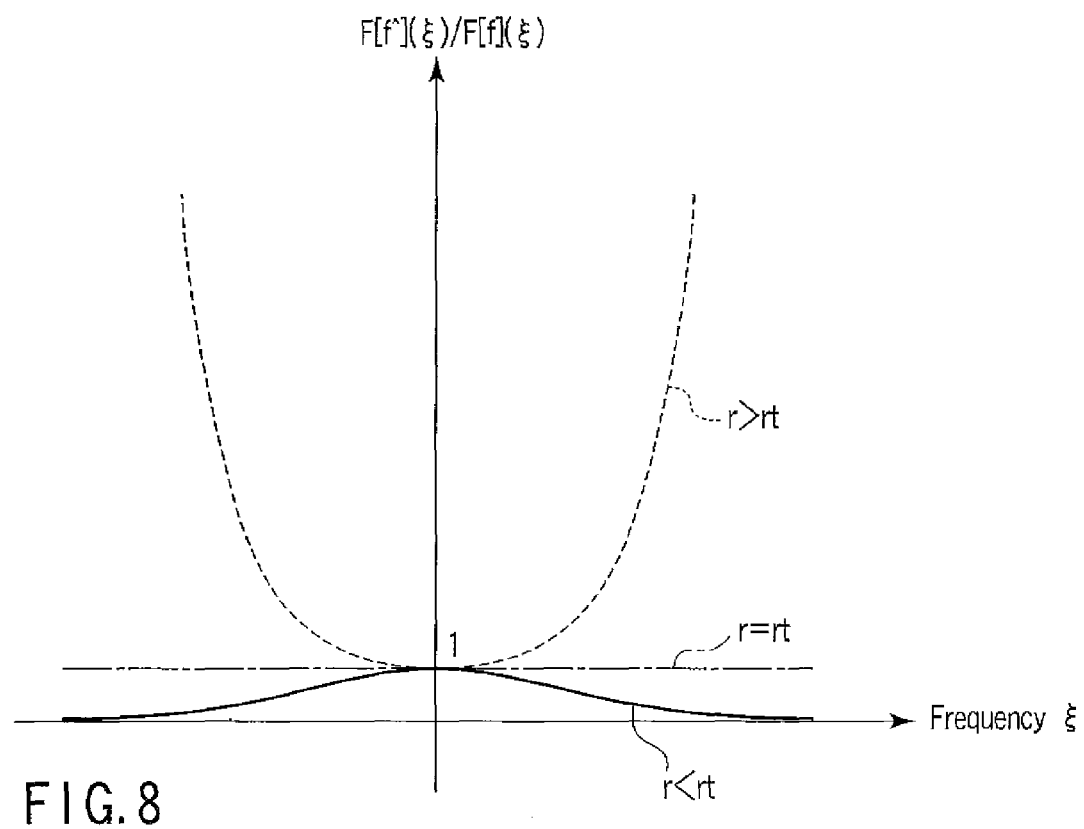
FIG. 8 is a graph one-dimensionally showing $\exp(-(rt^2-r^2)(\xi^2+\eta^2))$ with $\eta$ neglected which is regarded as a filter in the frequency domain for original image data f in Equation (24).

Exp(−(rt²−r²)(ξ²+η²)) in Equation (24) is considered to be a filter in the frequency domain for the original image data f. A graph for this filter can be one-dimensionally shown with η neglected on the basis of the magnitude relationship between r and rt, as shown in FIG. 8.

The graph shows that for r>rt, a high-frequency component of the deblurred image data is excessively amplified compared to that of the original image data. This discussion is for the case where b in Equation (2) is set at 1, but is also applicable to the cases where the value of b is not 1.

The case of a focus blur PSF in Equation (3) will be described below. When one-dimensionality is assumed for simplification, Equation (25) is given.

$$h(x) = 1/2r \text{ For } |x| \leq r \text{ other cases}$$
$$h(x) = 0 \text{ For other cases} \quad (25)$$

The Fourier transform of h (x) is given by Equation (26).

$$F[h](\xi) = sinc(r\xi) \quad (26)$$

Figure 9:
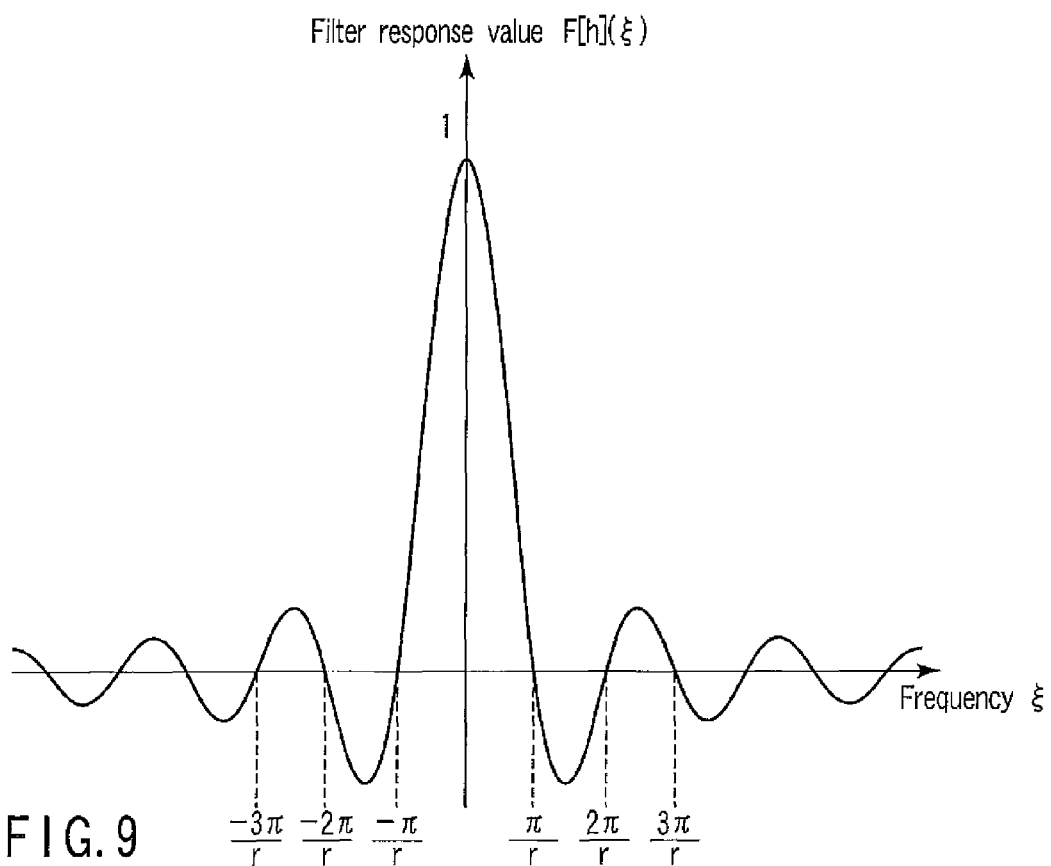
FIG. 9 is a graph showing Equation (26).

Equation (26) corresponds to a graph shown in FIG. 9. Equation (26) serves as a filter that not only attenuates the high-frequency component but also periodically zeros the frequency at ξ=mπ/r (m=±1, ±2, . . . ). Thus, unlike PSFs in Equations (1) and (2), the PSF in Equation (3) results in an excessive amplification based on a deconvolution even in a low-frequency region.

As described above, it is assumed that the original data f is subjected to blurring based on the defocus blur of the blur parameter value rt and that the resultant image data is deconvolved by the defocus blur based on the blur parameter value r. In this case, a simple inverse filter results in a denominator of 0. Thus, a pseudo-inverse filter in which a very small value ε is added to the denominator is used to obtain the relationship expressed by Equation (27).

$$F[f^\wedge](\xi) = F[f](\xi) sinc(r_t\xi) sinc(r\xi)/(sinc^2(r\xi)+\epsilon) \quad (27)$$

A value at a point ξ=mπ/r in Equation (27) where a value of Equation (26) is 0 is given by Equation (28).

$$F[f^\wedge](m\pi/r) = F[f](m\pi/r) sinc(m\pi/r)/\epsilon \quad (28)$$

The division by a very small value ε significantly amplifies a corresponding frequency component. Since the image data normally contains substantial low-frequency components, components at ξ=±π/r with m=±1 diverge significantly.

Figure 10:
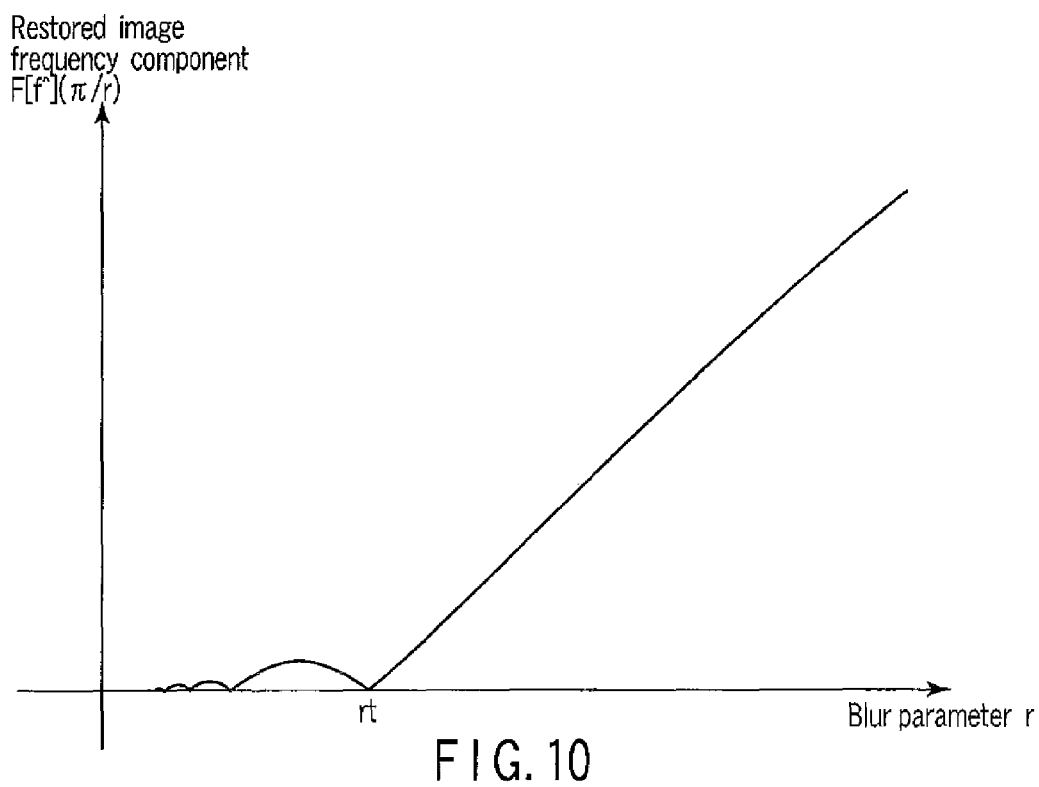
FIG. 10 is a graph showing Equation (28) with m=1 as a function with a blur parameter r.

The values of Equation (28) at m=1 can be graphed as a function of the blur parameter r as shown in FIG. 10. The graph indicates that for r>rt, the corresponding frequency component of the deblurred image data is excessively amplified compared to that of the original image data.

As described above, the PSFs in Equations (1) and (2) differ from the PSF in Equation (3) in a state of divergences of the image data resulting from the deconvolution. However, in either case, the divergence level increases when a blur parameter having a greater value than the true blur parameter value rt is used for the deconvolution. This also applies to general PSFs.

Thus, as shown in FIG. 5, described above, first, the divergence level $v_j(r)$ is calculated for each area Aj in a plurality of deblurred image data deconvolved using the blur parameter r.

The present embodiment uses the deblurred image data 51 to 5n obtained by the deconvolution section 4. However, the data may be generated by a simple deconvolution method using the pseudo-inverse filter or the like.

The deblurred image data required to estimate the blur parameter value need not have a high image quality. The deblurred image data judged to be appropriate may be divergent to some degree.

Then, for each area, the deblurred image data obtained immediately before the image starts to diverge significantly is selected as the best restoration result. That is, r obtained immediately before $v_j(r)$ starts to increase rapidly is determined to be the estimated value of the blur parameter for the area.

FIG. 11 shows an example of the relationship between the divergence level and the blur parameter. The rapid increase point may be determined by setting a threshold based on the divergence level of the deblurred image data ($v_j(0)$ for example), and selecting the maximum value of r providing $v_j(r)$ equal to or smaller than the threshold. It is also effective to normalize the divergence level on the basis of the size of the area in order to set the threshold. Alternatively, the maximum point of the second-order differential of $v_j(r)$ with respect to r may be selected.

In some cases, determination accuracy may be improved by smoothing $v_j(r)$ to suppress possible noise influence. Alternatively, it is possible to fit two straight lines to the values of $v_j(r)$ for r<r0 and for r>r0, respectively, in the vicinity of a certain r=r0 and to select such an r0 value as to maximize the angle between the two straight lines.

Since the above-described process results in the blur parameter value rj for each area Aj, the local estimated blur parameter value r(x, y) is obtained by stitching the blur parameter values rj for the areas Aj.

As post-processes shown in FIG. 5, described above, additional processes are executed such as filling in and smoothing for the estimated values.

First, filling-in is performed for the estimated value for following areas on the basis of surrounding areas: areas excluded from an estimation target owing to too small a size of the area or areas for which a reliable estimation cannot be made owing to small variation in divergence levels resulting from small variation in image values within the area. For example, the Laplacian equation in Equation (29) is solved for an area Aj having no estimated value.

$$\Delta r(x,y)=0 \qquad (29)$$

If the blur parameter values vary significantly at boundaries of the areas, a discontinuous portion may appear in the final restored image data. The local estimated blur parameter value r(x, y) is thus smoothed.

Alternatively, the equation in Equation (30) may be solved for r(x, y) for the entire image area I to simultaneously perform the filling-in and smoothing.

$$\Delta r(x,y)+\lambda(x,y)(r(x,y)-e(x,y))=0 \qquad (30)$$

For (x, y)∈Aj, if the area Aj has an estimated value of the blur parameter, $\lambda(x, y)=\lambda c$ and e(x, y)=rj. If the area Aj has no estimated value, λ(x, y)=0 and e(x, y)=0. The constant λc is a positive value indicating how closely the blur parameter value r(x, y) is to be fitted to the estimated value e (x, y) for each area. A reduction in the value of λc relatively enhances the effect of smoothing based on the Laplacian equation.

The image uniting section 8 units the plurality of deblurred image data generated by the deconvolution section 4, on the basis of r(x, y) of the blur parameter value 7a estimated by the local blur parameter estimating section 6. For each pair of coordinates (x, y), a surrounding area is assumed to be blurred as indicated by the blur parameter value r(x, y). Blur parameter values r1 and r2 that are closest to r (x, y) are selected from the predetermined blur parameter values (r1≦r (x, y)≦r2). Then, the deblurred image data f^1 and f^2 resulting from deconvolution with the parameters r1 and r2 are used to interpolate the united image data f^ as shown in Equation (31).

$$f^\wedge(x,y)=((r_2-r(x,y))f^\wedge_1(x,y)+(r(x,y)-r_1)f^\wedge_2(x,y))/(r_2-r_1) \qquad (31)$$

Changing a manner of uniting the images not only enables deblurring but also allows the image data to be converted so as to have an arbitrary blur state. To input image data blurred using the blur parameter value r(x, y) and to output image data blurred using a blur parameter value s(x, y) that is different from the local estimated blur parameter value r(x, y), it is necessary to remove (for r>s) or add (for r<s) a blur in accordance with a certain blur parameter value t(x, y). The value t(x, y) can be determined in accordance with the equation of the PSF.

For Equation (2), in the relation of Equation (32), superimposition of a blur resulting from the blur parameter value r1 on a blur resulting from the blur parameter value r2 corresponds to a blur resulting from a blur parameter value $\sqrt{(r1^2+r2^2)}$.

$$\exp(-r_1^2(\xi^2+\eta^2)^b)\exp(-r_2^2(\xi^2+\eta^2)^b)=\exp(-(r_1^2+r_2^2)(\xi^2+\eta^2)^b) \qquad (32)$$

Thus, for r>s, deblurring is preformed using $t=\sqrt{(r^2-s^2)}$. That is, the blur parameter values r1 and r2 that are closest to t (r1≦t≦r2) are selected, and interpolation is performed as is the case with Equation (31). Similarly, for r<s, the image data may be blurred using $t=\sqrt{(s^2-r^2)}$. The image data can be easily blurred only by convolution.

With a general PSF that is different from Equation (2), the superimposition of blurs as shown in Equation (32) cannot generally be satisfied. In this case, the blur state cannot be directly converted. Thus, first, clear image data may be generated by deblurring the whole image data, and then the resultant data may be arbitrarily blurred again.

The present embodiment, described above, can restore the original image data simply by inputting the single degraded image data 2a. The present embodiment eliminates a need to acquire blur information by inputting a plurality of image data or using a sensor. The present embodiment can, for example, deblur image data taken with a camera, improving an image quality of the taken image data.

The present embodiment performs the local blur estimation, eliminating a need to get a degree of the blur beforehand. In the present embodiment, the degree of the blur need not be uniform all over the image data. Even if the degree of the blur varies relatively significantly within the image data, the present embodiment can deblur or convert a state of the blur.

The present embodiment accepts arbitrary shapes of an area division for a local blur estimation. This enables a blur estimation in accordance with an image content of an image data, allowing a locality and accuracy of an estimation to be improved.

The present embodiment uses the PSF for the degraded image data 2a to deblur the degraded image data 2a at the plurality of levels and unites the appropriate data for the respective areas on the basis of the plurality of deblurred image data 51 to 5n to create the restored image data 9a. This allows a nonuniform blur to be removed by performing a plurality of processes of deconvolving the image data using a uniform PSF. The present embodiment enables the use of an efficient deconvolution method that prevents noise amplification.

In the present embodiment, the PSF has only to be parameterized by the degree of the blur, allowing the use of various types of PSF models.

In the present embodiment, the deconvolution process is executed on a luminance gradient obtained by differentiating the image data. A prior distribution of a luminance gradient of the image data is then applied. This enables high-quality deblurred image data to be obtained at high speed.

The present embodiment divides the degraded image data 2a into appropriate areas and selects the deblurred image data with the best restoration result for each area to estimate a local degree of the blur. Then, on the basis of the estimated local degree of the blur, the present embodiment unites the appropriate area data of some one of the deblurred image data to generate the restored image data 9a from which a nonuniform blur has been removed. The present embodiment can change the state of the blur by adjusting the manner of the unification of the appropriate area data.

In the present embodiment, the deconvolution section 4 may use the gradient domain deconvolution processing section 422 to apply deconvolution to the gradient image data of the degraded image data 2a. For the deconvolution, the gradient domain deconvolution processing section 422 may perform the deblurring in accordance with the prior distribution for the luminance gradient to generate first deconvolved data. Furthermore, the deconvolution section 4 may, for example, use the simple pseudo-inverse filter for the degraded image data 2a to perform deblurring independent of the prior distribution for the luminance gradient to generate second deconvolved data. In this case, the integrating section 423 integrates the first deconvolved data to generate first deblurred image data. The second deconvolved data is not originally differentiated and is thus directly used as second deblurred image data without being differentiated. The local blur parameter estimating section 6 generates the local estimated blur parameter values 7a on the basis of the second deblurred image data. On the basis of the local estimated blur parameter values 7a, the image uniting section 8 executes a process of uniting the first deblurred image data for each area to generate the restored image data 9a.

(Second Embodiment)

In the present embodiment, description will be given of an example of application of the image processing device in accordance with the first embodiment.

<Example of Application of the Image Processing Device>

FIG. 12 is a block diagram showing a first example of application of the image processing device 1 in accordance with the present invention.

FIG. 12 shows an example in which image data taken with an imaging device 12 is converted.

A light (for example, sunlight or room light) emitted by a light source 13 impinges on a subject (for example, a person, an object, or a scenery) 14. Reflected light from the subject 14 is received by the imaging device 12 via a lens 15. The size and refractive index of the lens 15 are determined in accordance with the application. For example, CCD or a CMOS sensor is used as the imaging device 12.

The imaging device 12 outputs an electric signal corresponding to the quantity of received light to a digitizer 16. The digitizer 16 converts the input electric signal into a digital signal to generate digital image data. The digitizer 16 then outputs the image data to the image processing device 1. Any of various AD converters is used as the digitizer 16.

The image processing device 1 may immediately convert the input image data or store the input image data in the storage device 17, later read the image data from a storage device 17, and then perform the conversion. The image processing device 1 performs operations similar to those of the first embodiment for the image conversion. The image processing device 1 stores the converted image data in the storage device 17 or outputs the image data to an output device 18.

The image processing device 1 may be implemented using a hardware circuit or a processor in a computer (for example, a PC or workstation) and software cooperating with the processor. For example, a semiconductor memory or a hard disk is used as the storage device 17.

The output device 18 outputs unconverted or converted image data depending on a user's specification. The output device 18 may output converted image data generated by the image processing device 1 or stored in the storage device 17. For example, a display or a printer may be used as the output device 18.

In the present embodiment, the light emitted by the light source 13 is not limited to visible light and may be a general electromagnetic wave. Alternatively, the light may be emitted by the subject 14 itself.

<Second Example of Application of the Image Processing Device>

FIG. 13 is a block diagram showing a second example of application of the image processing device 1 in accordance with the present embodiment.

In FIG. 13, the image processing device 1 is applied to MRI.

With MRI, a subject 19 is subjected to a magnetic field to emit an electromagnetic wave. The imaging device 12 outputs an electric signal corresponding to the quantity of electromagnetic wave received from the subject 19 to the image processing device 1 via the digitizer 16.

<Effects of the First and Second Examples of Application of the Image Processing Device>

The application of the image processing device 1 enables the degraded image data to be restored; the original clear image data can be restored from the blurred degraded image data containing noise. The image processing device 1 can deal with blurs varying locally within the image data.

The application of the image processing device 1 enables blurred photographic data due to defocus and camera shake to be made clear.

The application of the image processing device 1 enables the focal position of photographic data with a shallow depth of field to be changed.

The application of the image processing device 1 enables image data obtained through a telescope or a microscope to be clarified.

The application of the image processing device 1 enables image data read by a copier or a scanner to be clarified.

The application of the image processing device 1 enables old image or video data to be clarified.

The application of the image processing device 1 enables image data to be enlarged without leaving the image data blurry.

The application of the image processing device 1 enables SD videos to be converted into HD ones.

<PSFs Used for the Image Processing Device 1>

According to the present embodiment, for example, when applied to a camera, a scanner, or a microscope, the image processing device 1 can achieve an effective image conversion by using the Gaussian PSF in Equation (1) or the defocus PSF in Equation (3).

For example, when applied to a telescope, the image processing device 1 can achieve an effective image conversion by using the atmospheric turbulence PSF in Equation (2) with b=5/6 or the Gaussian PSF in Equation (1).

For example, when applied to electrography, the image processing device 1 can achieve an effective image conversion by using the X-ray scattering PSF in Equation (2) with b=1/2 or the Gaussian PSF in Equation (1).

The Gaussian PSF in Equation (1) exerts excellent effects in various application examples.

The image processing device 1 may use Equation (4) obtained by calibrating the PSF specialized for any of various application examples.

<Basis for the Area Division Used for the Image Processing Device 1>

In the preset embodiment, for example, when applied to a camera, scanner, an optical microscope, or an optical telescope, the image processing device 1 performs the area division on the basis of the similarity of colors.

For example, when applied to an electron microscope, a radio telescope, electrography, MRI, or CT, the image processing device 1 performs the area division on the basis of the similarity of luminance levels.

For example, when applied to a multi-wavelength telescope or a multi-wavelength microscope, the image processing device 1 performs the area division on the basis of the similarity of multi-channel signals.

<Prior Distribution for Luminance Gradient>

Prior distributions for luminance gradient specialized for respective application examples are obtained by preparing a plurality of typical image data to be handled in the application examples as samples and creating a histogram of the luminance gradients of the plurality of image data. Naturally, a general-purpose prior distribution for luminance gradient as shown in Equation (6) may also be used.

<Range and Increment of the Graded Blur Parameters>

The range of the graded blur parameters can be appropriately set in accordance with the problem to be solved by image conversion. The range of the blur parameters includes values of typical blur parameters corresponding to the problem to be solved. For example, even with the same camera, a different lens or resolution may change the range of the blur parameters to be taken into account.

The interval of the blur parameters is set on the basis of the desired accuracy.

<Application Example in which the Image Processing Device 1 Performs Image Conversion>

The image conversion performed by the image processing device 1 in accordance with the first embodiment is applicable to image retouch software and software provided in a digital camera.

The user can use the image conversion to correct or edit photographic data taken by the user. Specifically, the user can use the image conversion to, for example, correct out-of-focus photographic data. In particular, the user can use the image conversion performed by the image processing device 1 for photographic data intentionally taken with a shallow depth of field, to shift the focal position with the depth of field maintained and without deblurring the entire data.

The user can also use the blur conversion to correct or edit product image data to be posted on the Web or in a magazine. For example, after selecting a preferred one of several photographic data and processing the selected photographic data in various manners to allow the photographic data to be posted on the Web or in the magazine, the user may desire to modify the manner the selected photographic data is blurred when the overall balance is taken into account. In this case, instead of re-executing the processing starting with the selection of photographic data, the user can modify the manner the photographic data is blurred by using the image processing device 1 to perform the image conversion on the data being processed.

The user can also use the image conversion performed by the image processing device 1 to make the image data locally blurred in order to provide a poster or advertisement with a sense of speed.

Furthermore, if the user has taken a photograph of a dynamic object such as a person or an animal which shows a valuable moment and desires to partly modify the blur in the photograph, the user can modify the valuable photograph instead of re-taking a photograph with camera settings changed.

Further, if a photograph is inappropriate for the intended purpose (portrait, for example) owing to too noticeable a shadow resulting from an incorrect lighting condition during photograph taking, the shadow may be made blurred to provide the photograph with a soft appearance.

Moreover, from a single unique photograph such as a photograph of a historical character, photographs appearing to have been taken with different camera settings can be created.

The image conversion performed by the image processing device 1 is applicable to creating the effects of taking photographs with different camera settings using software. For example, the image conversion may be used in a digital camera LSI or control software for the digital camera LSI.

For example, if autofocus accuracy is reduced to cut down the costs of a digital camera, resulting in slight defocusing, the blur can be adjusted by the image conversion performed by the image processing device 1.

Furthermore, even if the lens in the digital camera is fixed, effects similar to those of replacement of the lens can be achieved by image conversion performed by the image processing device 1.

Moreover, a camera parameter can be changed without suffering restrictions associated with the mechanism of the camera. For example, mechanically changing the aperture stop in order to change the depth of field also changes the quantity of incoming light. Compensating for the quantity of incoming light on the basis of shutter speed induces motion blur. However, the image conversion performed by the image processing device 1 enables the depth of field to be changed without the need to change the aperture stop and a shutter speed.

The image conversion performed by the image processing device 1 can be used for a game machine LSI or software running on the game machine LSI.

For example, for a live-action material, the effect of shifting the focus from one object to another within one scene may need to be created. In this case, instead of playing back motion pictures of the shifting focus, the image conversion performed by the image processing device 1 can be used to move the position of a blur within one image to achieve the effect of shifting the focus. This enables a reduction in data length.

Furthermore, simple computer graphics (CC) images are entirely very clear and give the user an artificial impression. However, the application of the image conversion performed by the image processing device 1 enables to make a CG image blurred (that is, apply defocus or motion blur to the CG image) and natural.

The components of the above-described embodiments may be re-arranged or optionally combined together or may each be divided into pieces or some of the components may be omitted, provided that the resultant components can achieve similar operations. That is, the present embodiment is not limited to the above-described configurations proper. In implementation, the components may be varied without departing from the spirit of the present invention. For example, the storage devices 2, 3, 5, 7, and 9 may be optionally combined together.

The processing sections 4, 6, and 8 of the image processing device 1 in accordance with the above-described embodiments may be implemented by, for example, a processor controlled by a program. The program for the processing sections 4, 6, and 8 of the image processing device 1 in accordance with the above-described embodiments may be written to a storage medium, for example, a magnetic disk (flexible disk, hard disk, or the like), an optical disk (CD-ROM, DVD, or the like), or a semiconductor memory so as to be applied to a computer having the processor. Alternatively, the program may be transferred by a communication medium so as to be applied to the computer. The program is loaded into the computer to control the operation of the computer, which thus executes the functions of the image processing device 1. The programs may be distributively arranged in a plurality of computers, which cooperate in executing appropriate processes.

What is claimed is:

1. An image processing device comprising:
    a parameter varying unit which sets one of parameter values to a blur function including a parameter and indicating a state of a blur in sequence;
    a deconvolution processing unit which, on the basis of the blur function which is changed by the parameter varying unit, deblurs input image data to generate a plurality of deblurred image data;
    an area dividing unit which divides the input image data into a plurality of areas and generates area data indicating a result of an area division; and
    a local blur estimating unit which selects, for each area indicated by the area data, deblurred image data satisfying an appropriate condition from the plurality of deblurred image data to generate local blur estimation data on the basis of the parameter value corresponding to the deblurred image data selected for each area.

2. An image processing device according to claim 1, wherein the blur function is a Gaussian distribution.

3. An image processing device according to claim 1, wherein the local blur estimating unit calculates, for each area, divergence levels of the plurality of deblurred image data, the divergence level which increases depending on an increase of at least one of a periodic pattern and noise which are not contained in the input image data,
    selects, for each area, a parameter value corresponding to appropriate deblurred image data, a divergence level of the appropriate deblurred image data is immediately before an intense increase of the divergence levels, and generates the local blur estimation data indicating the parameter value selected for each area.

4. An image processing device according to claim 3, wherein the local blur estimating unit smoothes a selected parameter value at a boundary of each area.

5. An image processing device according to claim 1, further comprising an image uniting unit which, on the basis of the local blur estimation data, executes a process of uniting the deblurred image data selected for each area to generate output image data.

6. An image processing device according to claim 5, wherein the deconvolution processing section comprises:
    a differentiating unit which differentiates the input image data to generate gradient image data;
    a gradient domain deconvolution processing unit which applies a first deconvolution to the gradient image data, the first deconvolution performing deblurring corresponding to a prior distribution of an image gradient to generate deconvolved data, and applies a second deconvolution to the input image data, the second deconvolution performing deblurring which is independent of the prior distribution of the image gradient to generate second deblurred data; and
    an integrating unit which integrates the deconvolved data to generate first deblurred image data,
    wherein the local blur estimating unit calculates the appropriate condition for the second deblurred data, and
    the image uniting unit executes, on the basis of the local blur estimation data, the process of uniting the first deblurred image data selected for each area to generate the output image data.

7. An image processing device according to claim 6, wherein the prior distribution of the image gradient is a generalized Laplacian distribution.

8. An image processing method comprising:
    setting one of parameter values to a blur function including a parameter and indicating a state of a blur in sequence;
    deblurring input image data on the basis of the blur function which is changed by setting parameter values in sequence to generate a plurality of deblurred image data;
    dividing the input image data into a plurality of areas to generate area data indicating a result of an area division; and
    selecting, for each area indicated by the area data, deblurred image data satisfying an appropriate condition from the plurality of deblurred image data to generate local blur estimation data on the basis of the parameter value corresponding to the deblurred image data selected for each area.

9. An image processing method according to claim 8, wherein the generating the deblurred image data comprises;
    differentiating the input image data to generate gradient image data;
    applying a deconvolution to the gradient image data, the deconvolution performing deblurring corresponding to a prior distribution of an image gradient to generate deconvolved data; and
    integrating the deconvolved data to generate deblurred image data.

10. An image processing method according to claim 8, wherein the blur function is a Gaussian distribution.

11. An image processing method according to claim 8, wherein the generating the local blur estimation data comprises;

calculating, for each area, divergence levels of the plurality of deblurred image data, the divergence level which increases depending on an increase of at least one of a periodic pattern and noise which are not contained in the input image data, selecting, for each area, a parameter value corresponding to appropriate deblurred image data, a divergence level of the appropriate deblurred image data is immediately before an intense increase of the divergence levels, and generating the local blur estimation data indicating the parameter value selected for each area.

12. An image processing method according to claim 8, wherein the generating the local blur estimation data includes smoothing a selected parameter value at a boundary of each area.

13. An image processing method according to claim 8, further comprising executing a process of uniting the deblurred image data selected for each area on the basis of the local blur estimation data to generate output image data.

14. An image processing method according to claim 13, wherein the generating the deblurred image data comprises;

differentiating the input image data to generate gradient image data;

applying a first deconvolution to the gradient image data, the first deconvolution performing deblurring corresponding to a prior distribution of an image gradient to generate deconvolved data, and applying a second deconvolution to the input image data, the second deconvolution performing deblurring which is independent of the prior distribution of the image gradient to generate second deblurred data; and integrating the deconvolved data to generate first deblurred image data, wherein the generating the local blur estimation data calculates the appropriate condition for the second deblurred data, and the generating the output data executes, on the basis of the local blur estimation data, the process of uniting the first deblurred image data selected for each area to generate the output image data.

15. An image processing method according to claim 14, wherein the prior distribution of the image gradient is a generalized Laplacian distribution.

* * * * *